J. H. CAMP.
COMBINED ADVANCE DISCOUNT VOUCHER CHECK, ORDER, AND COMMERCIAL LETTER.
APPLICATION FILED JULY 12, 1919.

1,343,110.

Patented June 8, 1920.
2 SHEETS—SHEET 1.

WITNESSES

INVENTOR
J. H. CAMP,
BY Munn & Co
ATTORNEYS

J. H. CAMP.
COMBINED ADVANCE DISCOUNT VOUCHER CHECK, ORDER, AND COMMERCIAL LETTER.
APPLICATION FILED JULY 12, 1919.

1,343,110.

Patented June 8, 1920.
2 SHEETS—SHEET 2.

Fig. 2.

WITNESSES
George G. Myers.

INVENTOR
J. H. CAMP,
BY Munn & Co
ATTORNEYS

UNITED STATES PATENT OFFICE.

JAMES H. CAMP, OF RAVENSWOOD, WEST VIRGINIA.

COMBINED ADVANCE-DISCOUNT VOUCHER-CHECK, ORDER, AND COMMERCIAL LETTER.

1,343,110.   Specification of Letters Patent.   Patented June 8, 1920.

Application filed July 12, 1919. Serial No. 310,305.

*To all whom it may concern:*

Be it known that I, JAMES H. CAMP, a citizen of the United States, residing at Ravenswood, in the county of Jackson and State of West Virginia, have invented new and useful Improvements in Combined Advance-Discount Voucher-Check, Order, and Commercial Letter, of which the following is a specification.

My invention relates to a written instrument or combined voucher check, blank order and personal letter, from the seller to the purchaser, and a blank letter for the reply to the seller from the purchaser.

An important object of the invention is to provide a device of the above mentioned character having means to indicate to the purchaser certain discounts, rebates, etc., and effecting an advanced payment of the same to the purchaser, the acceptance of such payment constituting an acceptance of the proposed order.

A further object of the invention is to provide a device of the above mentioned character, which is of simple construction and is adapted to eliminate the necessity of traveling salesmen in disposing of merchandise.

Other objects and advantages of the invention will be apparent during the course of the following description.

In the accompanying drawings, forming a part of this specification, and in which like numerals are employed to designate like parts throughout the same, Figure 1 is a side elevation of the written instrument embodying my invention, and, Fig. 2 is a similar view of the opposite side of the device.

The instrument or device comprises a sheet of paper 5, which is foldable upon a central longitudinal perforated line 7, providing sections 8 and 9, which may be separated, when desired.

Upon the upper side of the section 8 is printed a check, having a line 10 for the date, line 11 for the reception of the name of the payee of the check and the amount in numerals for which the check is made payable. Beneath the line 11 is a line 12, for receiving the amount in writing for which the check is made out. Beneath the line 12 is a space 13, within which is printed certain instructions in connection with the use of the check, to wit, "The indorsement and use of this check constitutes an acceptance of the order on the back hereof; no bank, bank official, or person shall cash or accept this check for anything of value from any individual or firm, known, or that they have reasons to believe is, irresponsible." Beneath the line 13 is a line 14 for the reception of the name of the bank upon which the check is drawn, and beneath this line is a line 15 for the reception of the address of the bank. To one side of the line 15 is a line 16, for the reception of the name of the maker of the check, as shown. The check is also provided near its top and at its right end with a line 17 to receive the number of the check, and this line is designated "No." At the left end of the check is a transverse line 18, for the reception of the name of the president or other person by whom the check is countersigned.

As shown in Fig. 2, on opposite side of the check section 8 is a line 19, for the reception of the date, beneath which is printed or written "We have this day accepted the following order." Beneath these words are a number of transverse lines 20 for receiving a list of the goods or merchandise ordered. Beneath the lines 20 is a transverse line for the reception of the name of the purchaser, who is also the payee of the check. Beneath the line 21 is a line 22 for the reception of the post-office address of the indorser. It is thus seen that as soon as the purchaser indorses the check he accepts the order.

The section 9 is provided with a space 22', to be utilized as a business letter which is written by the manufacturer or promoter to the prospective purchaser. This letter may be individually written, or it may be a form letter suitable for the business of the user. The upper surface of the section 9 may be provided with the address 23 of the manufacturer, promoter or merchant, and space 24 for the reception of the date. At the left side of this letter are lines 25, for the reception of the name of the prospective purchaser. Lines 26 and 27 are provided for the name of the manufacturer or merchant or promoter.

The opposite side or surface of the section 9 provides a space 28, for the reception of a letter from the purchaser to the manufacturer or promoter. This letter may be a form letter previously printed or written in the space 28. This form letter may consist of a line 29 at the upper right-hand corner for the reception of the date, and lines 30 at the left-hand corner for the reception of the name and address of the manufacturer or promoter. Lines 31 and 32 are provided in the lower left-hand corner for the post-office and shipping address of the purchaser. Lines 33 and 34 receive the name of the purchaser, when he accepts the proposition. The body portion of the letter in the space 28 may be of any suitable character, such as, "Your proposition received; we have this day indorsed and used your advanced discount check, thereby accepting the same. You will therefore forward goods at your earliest convenience, making shipment in compliance with your standard methods."

As an illustration of the use of the instrument, attention is now called to the space 22'. In this space is written a letter by the manufacturer or promoter to the proposed purchaser. In this letter certain discounts for cash and for salesmen's commissions are indicated, the same amounting to $342.00. The check is made out for this amount and is made payable to the prospective purchaser and is signed by the manufacturer or promoter. The manufacturer or promoter also fills in the list of articles offered to the proposed purchaser upon the lines 20. The device is then mailed to the proposed purchaser, and if he accepts the proposition he signs the letter in the space 28 at the line 33 and detaches the same from the check. This letter is returned to the manufacturer, informing the same that the order has been accepted. The purchaser also indorses the check upon the line 12, and in so doing accepts the order and effects a binding contract.

Having thus described my invention, I claim:

A device of the character described, comprising a sheet one face of which bears an inscription which is in effect a letter from the manufacturer or promoter to a proposed purchaser offering a stated amount of goods for sale and a certain amount of money payable to the purchaser as a discount and a reference to an accompanying check for the amount of said discount, said sheet having upon its opposite face an inscription which is in effect a letter from the purchaser to the manufacturer or promoter stating that the check referred to in the letter from the manufacturer or promoter has been used and that the offer of the goods for sale has been accepted; and a second sheet detachably secured to the first named sheet, said second sheet bearing upon one face thereof and upon the same side of the device with the first named letter a blank check form, said last named face having an inscription designating in effect that the indorsement of the check constitutes an acceptance of the order on the opposite face of the check, said second sheet bearing upon its opposite face an inscription designating in effect an order of goods and its acceptance by the purchaser and an indorsement of the check by the purchaser.

J. H. CAMP.